United States Patent
Minami (10) Patent No.: US 7,525,743 B2
(45) Date of Patent: Apr. 28, 2009

(54) COMBINATION LENSE AND METHOD FOR MANUFACTURING SAME

(75) Inventor: Kohji Minami, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 27 days.

(21) Appl. No.: 11/825,441

(22) Filed: Jul. 5, 2007

(65) Prior Publication Data

US 2008/0007848 A1    Jan. 10, 2008

(30) Foreign Application Priority Data

Jul. 7, 2006  (JP) .............................. 2006-188141

(51) Int. Cl.
G02B 7/02     (2006.01)

(52) U.S. Cl. ..................... 359/811; 359/819; 359/822

(58) Field of Classification Search .......... 359/811–830
See application file for complete search history.

(56) References Cited

U.S. PATENT DOCUMENTS 5,502,598 A * 3/1996 Kimura et al. .............. 359/814
5,896,234 A   4/1999 Miyamoto et al.

FOREIGN PATENT DOCUMENTS

| DE | 1924017 | 11/1970 |
|---|---|---|
| EP | 1 674 909 A1 | 6/2006 |
| JP | 58-087505 | 5/1983 |
| JP | 02-304511 | 12/1990 |
| JP | 07-248441 | 9/1995 |
| JP | 09-318858 | 12/1997 |
| JP | 09-318859 | 12/1997 |
| JP | 10-186196 | 7/1998 |
| JP | 2006-285074 | 10/2006 |
| WO | WO-2007/122945 A1 | 11/2007 |

* cited by examiner

*Primary Examiner*—Mohammed Hasan
(74) *Attorney, Agent, or Firm*—Edwards Angell Palmer & Dodge LLP; David G. Conlin; David A. Tucker (57) ABSTRACT

A combination lens according to an embodiment of the present invention includes at least two lenses housed in a lens barrel, three or more spherical bodies disposed between the lenses, and support members that respectively support these spherical bodies by tack force or adhesive force. The support members are disposed along the inner peripheral wall of the lens barrel and support part of the spherical surface of the spherical bodies.

8 Claims, 6 Drawing Sheets

COMBINATION LENSE AND METHOD FOR MANUFACTURING SAME

This application claims priority under 35 U.S.C. §119(a) on Japanese Patent Application 2006-188141 filed in Japan on Jul. 7, 2006, and the contents thereof are incorporated herein by reference in their entirety.

BACKGROUND OF THE INVENTION

1. Field of the Invention

The present invention relates to a combination lens in which a plurality of lenses are housed in a lens barrel, and to a method for manufacturing this combination lens.

2. Description of the Related Art

With a combination lens in which a plurality of lenses are housed in a lens barrel, the spacing between the lenses needs to be maintained at high precision, and various structures have been proposed to this end. For instance, a structure has been proposed in which a plurality of spherical bodies are sandwiched between the lenses to maintain the lens spacing at high precision.

Figure 10:
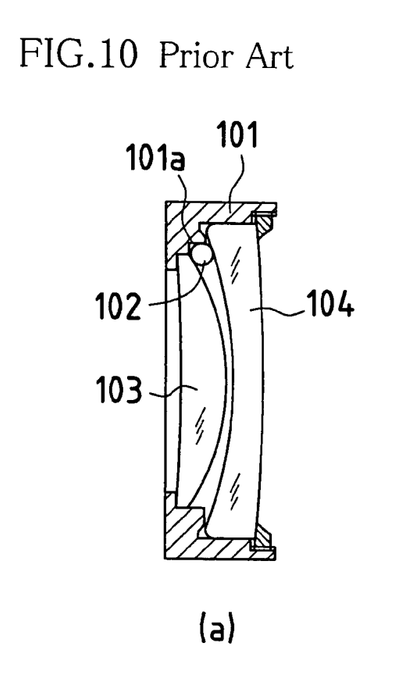
FIG. 10 is a side view of a conventional example.
Figure 11:
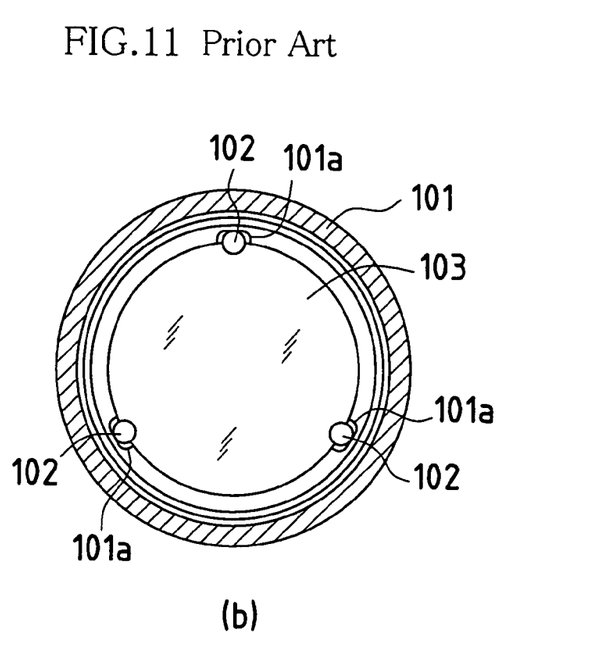
FIG. 11 is a plan view of a conventional example.

In JP H9-318858A, as shown in FIGS. 10 and 11, a plurality of concavities 101a are formed in the inner periphery of a lens frame 101, steel balls 102 are disposed in these concavities 101a for positioning, and the steel balls 102 are sandwiched between the opposing faces of lenses 103 and 104, thereby maintaining the spacing between the lenses at a predetermined distance.

Figure 12:
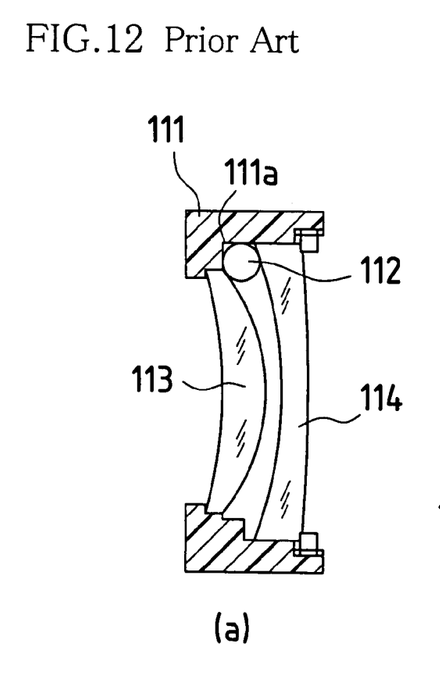
FIG. 12 is a side view of another conventional example.
Figure 13:
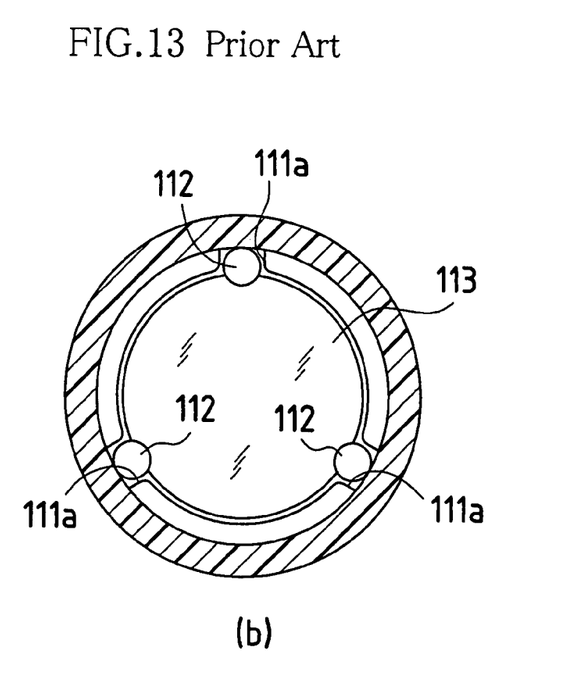
FIG. 13 is a plan view of another conventional example.

Similarly, in JP H9-318859A, as shown in FIGS. 12 and 13, steel balls 112 are disposed in concavities 111a for positioning that are formed in the inner periphery of a lens frame 111, and the steel balls 112 are sandwiched between the opposing faces of lenses 113 and 114, thereby maintaining the spacing between the lenses at a predetermined distance.

Nevertheless, JP H9-318858A and JP H9-318859A require that the concavities be made sufficiently large so that they can easily accommodate the steel balls. Consequently, the positioning precision of the steel balls is not always good, and the lenses are sometimes fixed while the steel balls are still out of position, which can lead to a tilt between the lenses, deviation of the optical axis, and so forth.

Also, a plurality of steps or flanges must be formed around the inner periphery of the lens frame, but it is not easy to maintain the machining precision of the lens frame, and this can lead to a tilt between the lenses, deviation of the optical axis, and such problems, and also makes it harder to lower cost.

Furthermore, the smaller is the lens diameter, the smaller the lens frame has to be made, and it has been difficult to produce and assemble such lens frames.

SUMMARY OF THE INVENTION

In view of this, the present invention was conceived in light of the above problems encountered in the past, and it is an object of the present invention to provide a combination lens that has a simple structure, but with which spherical bodies can be sandwiched between the lenses so that the lens spacing can be maintained at high precision, and a method for manufacturing this combination lens.

To solve the above problems, the combination lens of the present invention is a combination lens in which at least two lenses are housed in a lens barrel, comprising at least three spherical bodies disposed between the lenses, and support members that respectively support the spherical bodies by tack force or adhesive force, wherein the support members are disposed along the inner peripheral wall of the lens barrel, and support part of the spherical surface of the spherical bodies.

Also, the support members may be disposed at one of the opposing faces of the lenses.

Further, the support members may be a photosetting type of adhesive agent.

Also, the height of the support members in the radial direction of the lenses may be greater than the radius of the spherical bodies.

Further, the thickness of the support members in the optical axis direction of the lenses may be greater than the radius of the spherical bodies.

Also, the spherical bodies may be made of a paramagnetic substance.

Further, the support members may be bonded to the inner peripheral wall of the lens barrel.

Meanwhile, a manufacturing method of the present invention is a method for manufacturing the above-mentioned combination lens of the present invention, wherein centrifugal force is generated in the spherical bodies around the optical axis of the lenses, so that the spherical bodies come into contact with the inner peripheral wall of the lens barrel and with the support members, and the spherical bodies are supported by the support members.

With this combination lens of the present invention, at least three spherical bodies and support members that respectively support the spherical bodies by tack force or adhesive force are disposed between the lenses. The support members are disposed along the inner peripheral wall of the lens barrel, and each support member supports part of the spherical surface of the spherical body. Therefore, the spherical bodies are sandwiched between the lenses in a state in which the spherical bodies are positioned along the inner peripheral wall of the lens barrel. This sets the distance between the lenses.

The support members here are each separate members, only support part of the spherical surface of each spherical body by its tack force or adhesive force, and do not determine the positioning accuracy of the lenses and therefore do not require dimensional precision. The positioning precision of the opposing faces of the lenses is determined by the dimensional precision and positioning precision of the spherical bodies. The former (the dimensional precision of the spherical bodies) has been adequately increased by known art. Also, since the spherical bodies are supported by the support members disposed along the inner peripheral wall of the lens barrel, and positioning is accomplished by bringing the spherical bodies into contact with the inner peripheral face of the lens barrel, the latter (the positioning precision of the spherical bodies) is determined by the precision of the inner peripheral face of the lens barrel. This inner periphery of the lens barrel merely supports the outer periphery of the lenses, or serves as a contact face with the spherical bodies, and therefore needs no special, complicated machining, and can be easily finished at high precision. Therefore, the spherical bodies can be positioned at high precision, and the positioning precision of the opposing faces of the lenses can be adequately increased.

Furthermore, the spherical bodies are securely supported by the tack force or adhesive force of the support members without a deviation. Accordingly, there is no positioning deviation of the spherical bodies, nor is there any tilt between the lenses, deviation of the optical axis, and so forth that would otherwise be caused by this positioning deviation.

Furthermore, since only part of the spherical surfaces of the spherical bodies is supported by the tack force or adhesive force of the support members, no tacking agent or adhesive agent is interposed between the spherical bodies and the lens surfaces, or between the spherical bodies and the inner periphery of the lens barrel, and instead the spherical bodies come into direct contact with the lens surfaces and the inner periphery of the lens barrel, allowing the spherical bodies to be positioned more precisely, which in turn allows the positioning precision of the opposing faces of the lenses to be adequately increased.

Also, the support members are disposed at one of the opposing faces of the lenses, which facilitates disposition of the support members.

For example, the support members are a photosetting type of adhesive agent, by using a photosetting type of adhesive agent, after the spherical bodies are disposed onto the support members, the support member are cured, and thereby the spherical bodies can be fixed. This facilitates the disposition, alignment, and so forth of the spherical bodies. Also, a thermosetting or other type of adhesive agent or tacking agent or the like can be used instead of a photosetting type of adhesive agent.

Also, since the height of the support members in the radial direction of the lenses is greater than the radius of the spherical bodies, the lenses can be supported more securely by the support members.

Furthermore, since the thickness of the support members in the optical axis direction of the lenses is greater than the radius of the spherical bodies, the spherical bodies are not apt to roll away from the support members. This is particularly effective when the spherical bodies easily roll around on the lens.

Furthermore, since the spherical bodies are made of a paramagnetic substance, they will not be magnetized, and will not be attracted to each other by magnetic force, and therefore positional deviation of the spherical bodies does not occur.

Also, since the support members are bonded to the inner peripheral wall of the lens barrel, distortion of the support members can be suppressed, and positional deviation of the spherical bodies can be prevented.

Meanwhile, according to a manufacturing method of the present invention, centrifugal force is generated in the spherical bodies around the optical axis of the lenses to bring the spherical bodies into contact with the inner peripheral wall of the lens barrel and with the support members, and the spherical bodies are supported by the support members. Accordingly, the spherical bodies can be easily and quickly positioned and fixed at high precision.

DESCRIPTION OF THE PREFERRED EMBODIMENTS

An embodiment of the present invention will now be described in detail through reference to the appended drawings.

Figure 1:
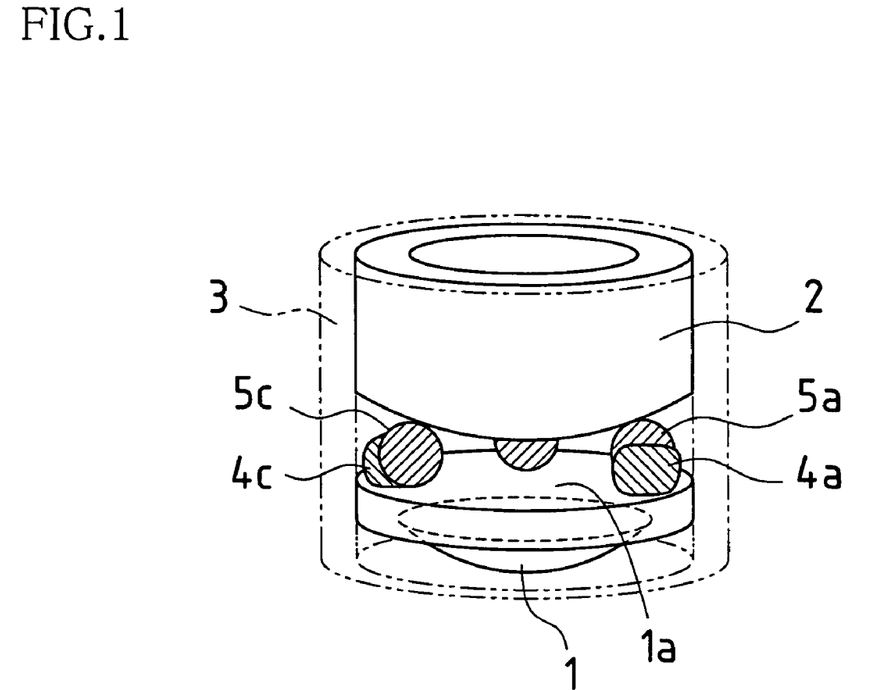
FIG. 1 is a perspective see-through view of a combination lens according to an embodiment of the present invention.
Figure 2:
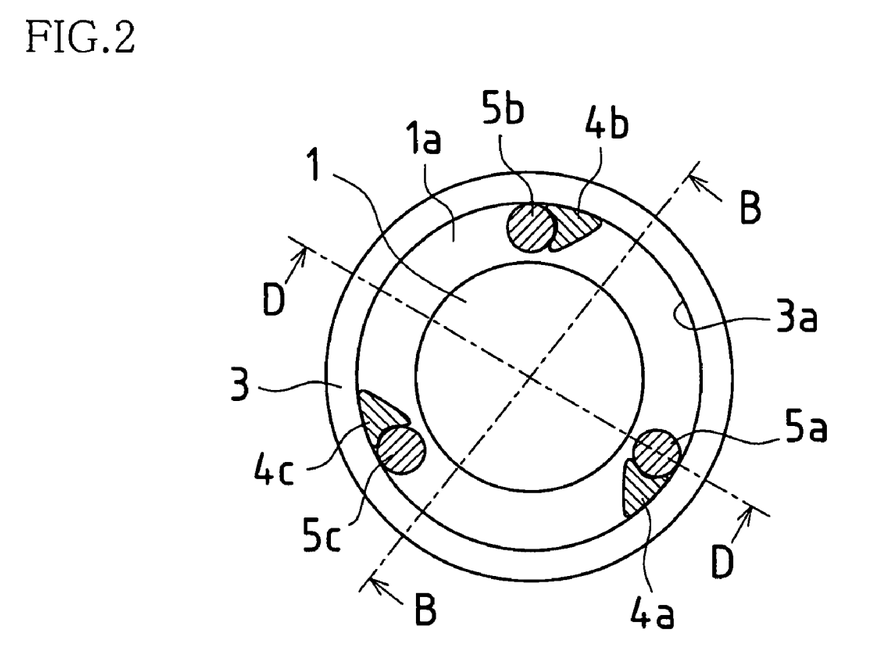
FIG. 2 is a transverse cross section of the combination lens in FIG. 1.
Figure 3:
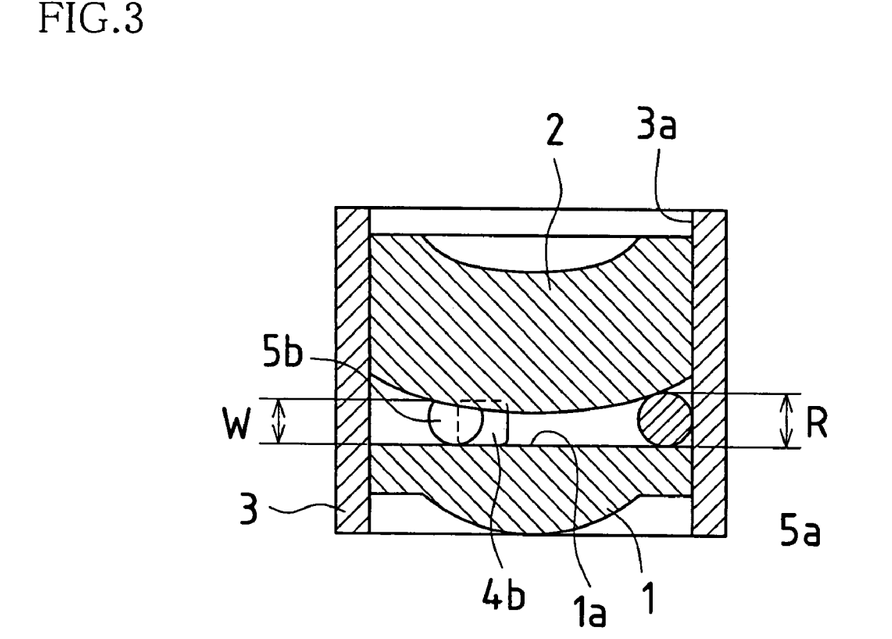
FIG. 3 is a vertical cross section, viewed along the D-D line in FIG. 2.
Figure 4:
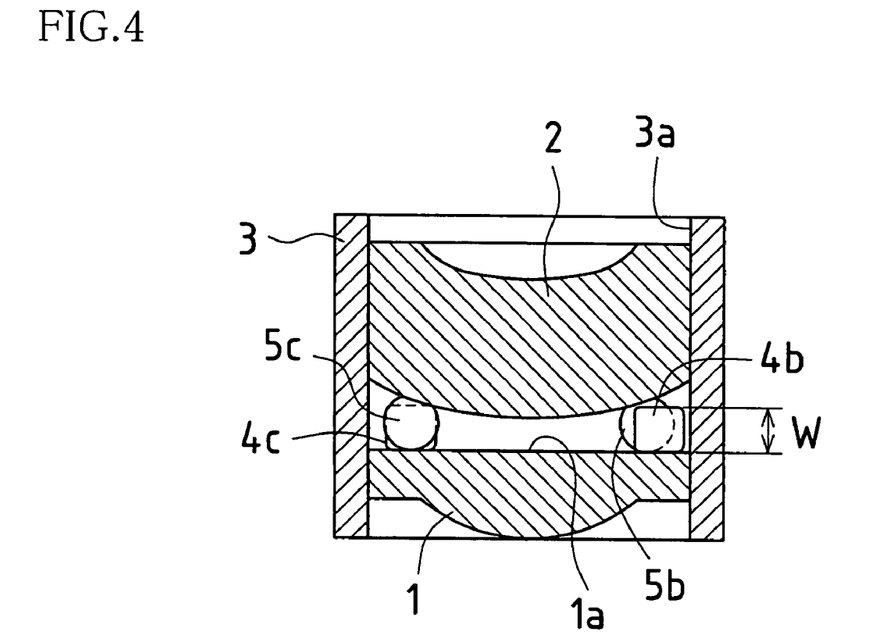
FIG. 4 is a vertical cross section, viewed along the B-B line in FIG. 2.

FIGS. 1 to 4 show an embodiment of the combination lens of the present invention. FIG. 1 is a perspective see-through view of a combination lens of this embodiment, FIG. 2 is a transverse cross section of the combination lens, FIG. 3 is a vertical cross section, viewed along the D-D line in FIG. 2, and FIG. 4 is a vertical cross section, viewed along the B-B line in FIG. 2.

In the combination lens of this embodiment, two lenses 1 and 2 are housed in a lens barrel 3, three support members 4a, 4b, and 4c are provided between the lenses 1 and 2 at the outer peripheral parts thereof, and the support members 4a to 4c are disposed equidistantly along the inner peripheral wall 3a of the lens barrel 3. Three spherical bodies 5a, 5b, and 5c are supported by the support members 4a to 4c, respectively, the spherical bodies 5a to 5c are interposed between the lenses 1 and 2 at the outer peripheral parts thereof, and the spherical bodies 5a to 5c keep the opposing faces of the lenses 1 and 2 apart at a constant distance.

Therefore, the spherical bodies 5a to 5c serve as spacers for keeping the distance between the lenses 1 and 2 at a constant distance that are disposed equidistantly along the inner peripheral wall 3a of the lens barrel 3 between the lenses 1 and 2 at the outer peripheral parts thereof. By using spherical bodies having little dimensional error in the diameter as the spherical bodies 5a to 5c, it is possible to set the distance between the lenses 1 and 2 at high precision and to minimize a tilt between the lenses 1 and 2 and a deviation of the optical axis.

The lens 1 is a lens having a flat edge 1a at its outer peripheral part, as typified by a glass molded lens or a resin molded lens. The lens 2 has no flat edge, as typified by a polished spherical lens.

Figure 5:
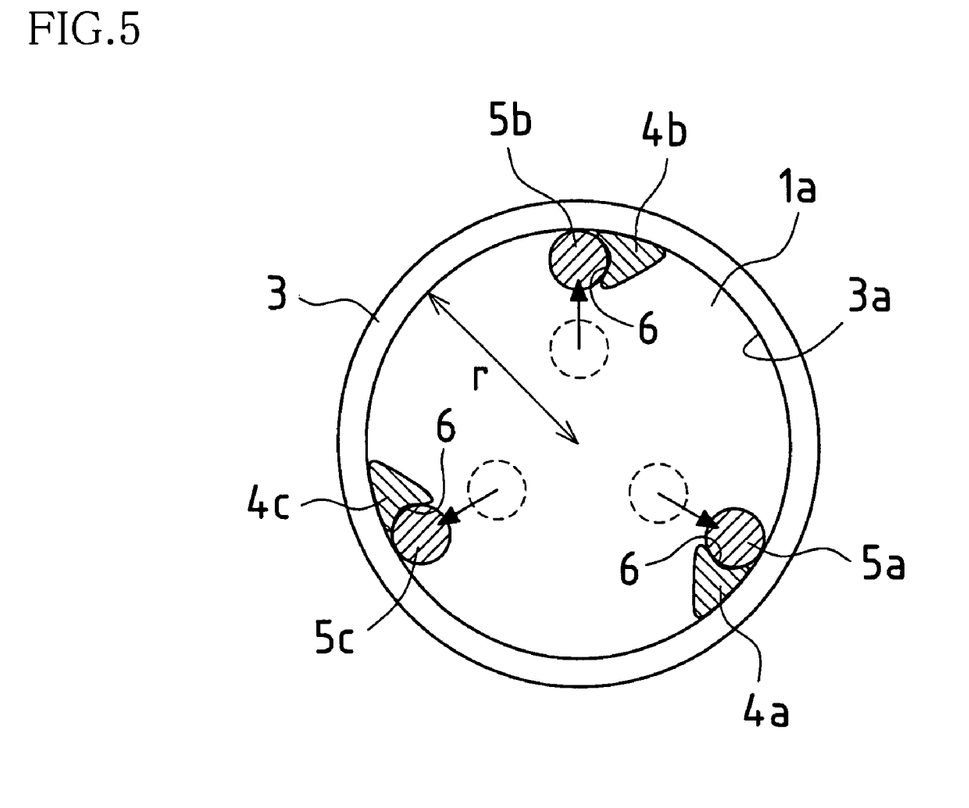
FIG. 5 is a plan view showing the spherical bodies and support members on a lens of the combination lens of FIG. 1.

The support members 4a to 4c are composed of a synthetic resin, such as a tacking agent, an elastic adhesive, or a UV-setting adhesive. After the lens 1 is installed into the lens barrel 3, these support members 4a to 4c are disposed on the flat edge 1a at the outer peripheral part of the lens 1 as shown in FIG. 5, such that they come into tight contact with the inner peripheral wall 3a of the lens barrel 3, and are fixed to the inner peripheral wall 3a of the lens barrel 3 and the flat edge 1a by their own tack force and adhesive force. Therefore, the support members 4a to 4c are securely supported in a state of being in tight contact with the inner peripheral wall 3a of the lens barrel 3 and the flat edge 1a at the outer peripheral part of the lens 1, so these support members are less apt to undergo self-distortion, and are able to securely support the spherical bodies 5a to 5c.

Figure 6:
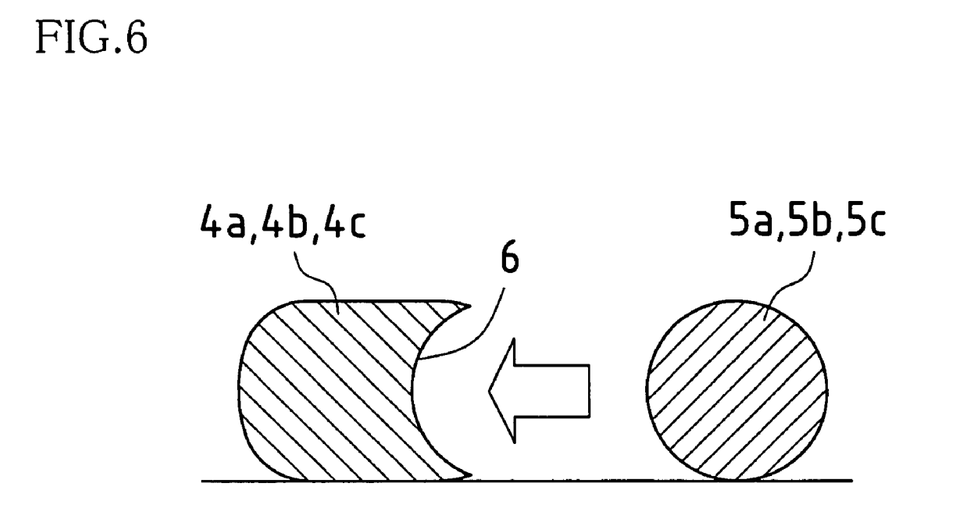
FIG. 6 is an enlarged side view of the spherical bodies and support members on a lens of the combination lens of FIG. 1.

Also, as shown in FIG. 6, the support members 4a to 4c receive the spherical bodies 5a to 5c in recesses 6 at one end thereof, and the spherical bodies 5a to 5c are supported and fixed by the tack force or adhesive force of the recesses 6.

The recesses 6 of the support members 4a to 4c do not have to be formed in advance, and may be formed when the spherical bodies 5a to 5c are to be supported. As shown in FIG. 6, the recess 6 of each support member 4a, 4b, 4c can be formed by pressing the spherical body 5a, 5b, 5c against one end of the support member 4a, 4b, 4c to deform the one end of the support member 4a, 4b, 4c. This allows the spherical bodies 5a to 5c to be supported and fixed in the recesses 6 of the support members 4a to 4c.

In the case where the support members 4a to 4c are a tacking agent, then in the disposition of the spherical bodies, the recesses in the support members are deformed into a shape substantially conforming to the spherical bodies, so that the spherical bodies will fit into the recesses more easily. Thereby, the spherical bodies can be securely supported and fixed by the recesses of the support members. Since the lens 2 is installed into the lens barrel 3 after the spherical bodies 5a to 5c have been supported and fixed by the support members 4a to 4c, respectively, on the flat edge 1a at the outer peripheral part of the lens 1, the lens 2 can be easily mounted without causing any positional deviation of the spherical bodies 5a to 5c.

In the case where the support members 4a to 4c are an elastic adhesive agent, then the spherical bodies 5a to 5c are pressed against one end of the support members 4a to 4c, respectively, to form the recesses 6 in the support members 4a to 4c, and at the same time the spherical bodies 5a to 5c can be supported and fixed by the recesses 6 of the support members 4a to 4c, respectively. Since the spherical bodies 5a to 5c are supported and fixed on the flat edge 1a at the outer peripheral part of the lens 1, the lens 2 can be easily mounted without causing any positional deviation of the spherical bodies 5a to 5c.

Further, in the case where the support members 4a to 4c are a UV-setting adhesive agent, even when the spherical bodies 5a to 5c are pressed against one end of the support members 4a to 4c, respectively, the spherical bodies 5a to 5c will be only semi-fixed by the recesses 6 of the support members 4a to 4c, so the disposition, positioning, and so forth of the spherical bodies 5a to 5c can be easily corrected. After this, the lens 2 is mounted inside the lens barrel 3 and the support members 4a to 4c are cured by UV rays through the lens, so that the spherical bodies 5a to 5c are supported and fixed by the recesses 6 of the support members 4a to 4c. This simplifies the manufacturing process.

Here, as shown in FIG. 3, when the thickness of the support members 4a to 4c in the optical axis direction of the lenses 1 and 2 is assumed to be W, this thickness W is set to be more than half the radius R/2 of the spherical bodies 5a to 5c, and less than a height that will not hinder the lenses 1 and 2 from coming into contact with the spherical bodies 5a to 5c. If the thickness W is more than half the radius R/2 of the spherical bodies 5a to 5c, the spherical bodies 5a to 5c will not roll away from the support members 4a to 4c. Also, since the thickness W is set to a height that will not hinder the lenses 1 and 2 from coming into contact with the spherical bodies 5a to 5c, while the spherical bodies 5a to 5c will be securely supported by the recesses 6 in the support members 4a to 4c, they will also be directly sandwiched between the lenses 1 and 2, pushed outward by the convex surface of the lens 2, and pressed against the inner peripheral wall 3a of the lens barrel 3. As a result, the spherical bodies 5a to 5c are accurately positioned in a state of direct contact with the inner peripheral wall 3a of the lens barrel 3 and with the lenses 1 and 2, the opposing faces of the lenses 1 and 2 are kept apart at a constant distance by the spherical bodies 5a to 5c, and the precision of this spacing depends only on the dimensional precision of the spherical bodies 5a to 5c.

Figure 7:
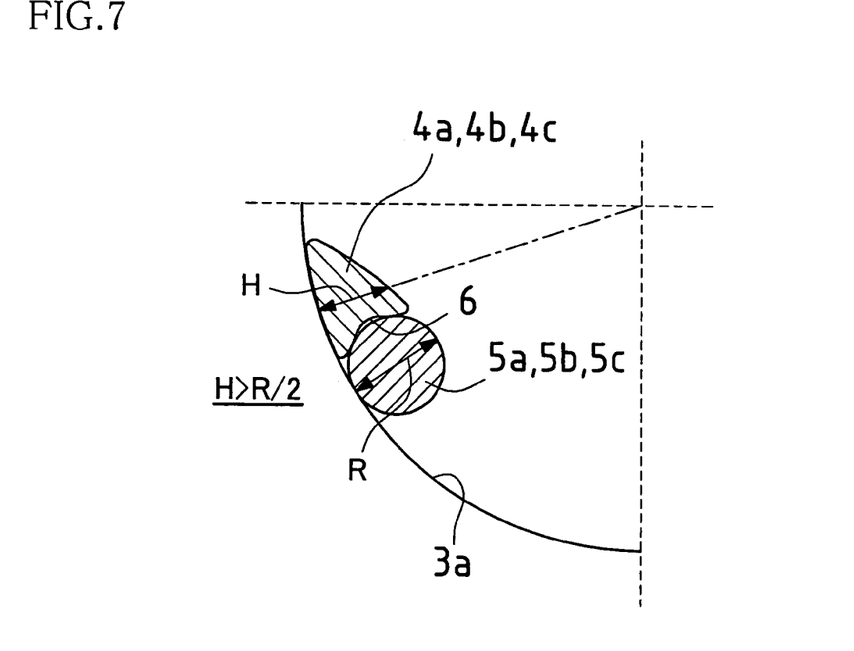
FIG. 7 is an enlarged plan view of the spherical bodies and support members on a lens of the combination lens of FIG. 1.

Also, as shown in FIG. 7, when the height of the support members 4a to 4c in the radial direction of the lenses 1 and 2 is assumed to be H, this height H is set to be more than half the radius R/2 of the spherical bodies 5a to 5c. As a result, the recesses 6 of the support members 4a to 4c have a shape and size that readily accommodate the spherical bodies 5a to 5c, allowing the spherical bodies 5a to 5c to be securely supported and fixed by the recesses 6 in the support members 4a to 4c.

The spherical bodies 5a to 5c are disposed equidistantly along the inner peripheral wall 3a of the lens barrel 3 between the lenses 1 and 2 at the outer peripheral parts thereof, as has already been mentioned. Therefore, if the lens is subjected to an impact, this impact is dispersed substantially uniformly over the spherical bodies 5a to 5c, whereby a problem can be avoided in which the impact is concentrated in a single spherical body and the lens breaks. The greater the number of spherical bodies, the more the impact will be dispersed, the more the force to which a single spherical body is subjected will be reduced, and the less likely it is that the lens will break.

Ceramic balls (such as silicon nitride balls or alumina balls) or glass balls can be used as the spherical bodies 5a to 5c. These spherical bodies have highly precise diameters, and the nominal difference in size between spherical bodies can be kept to about 1 μm, so not only the lenses 1 and 2 can be kept apart at a precise distance, but a tilt between the lenses 1 and 2 also can be suppressed, and the parallelism of the lenses 1 and 2 can be kept at high precision. For example, if the inside diameter of the lens barrel 3 is 4 mm, the tilt between the lenses 1 and 2 can be kept to 1.5 minutes (of arc) at most.

When the spherical bodies 5a to 5c are supported and fixed by the tack force or adhesive force of the recesses 6 in the support members 4a to 4c as in this embodiment, there is the possibility that the spherical bodies 5a to 5c may fall out of the recesses 6 in the support members 4a to 4c. In particular, if the spherical bodies 5a to 5c fall out and shift in their position after they have been supported by the support members 4a to 4c on the flat edge 1a of the lens 1, then when the spherical bodies 5a to 5c are sandwiched between the lenses 1 and 2, the distance between the lenses 1 and 2 will be uneven and a tilt will occur between the lenses.

For example, when the spherical bodies 5a to 5c are magnetized, magnetic force is exerted between the spherical bodies, and it is possible that the spherical bodies may fall out of the recesses 6 of the support members. It is therefore better for the spherical bodies 5a to 5c to be made of a paramagnetic substance. As mentioned above, ceramic balls (such as silicon nitride balls or alumina balls) or glass balls are preferable in this respect as well. Ceramic balls are particularly effective in terms of the precision of the balls and the durability of the spherical surfaces.

Thus, in the combination lens of this embodiment, the spherical bodies 5a to 5c are supported by the tack force or adhesive force of the support members 4a to 4c, the spherical bodies 5a to 5c are sandwiched between the lenses 1 and 2, and this positions the opposing faces of the lenses 1 and 2. This positioning precision is determined not by the dimensional precision of the support members 4a to 4c, but by the positioning precision and dimensional precision of the spherical bodies 5a to 5c. The former (the dimensional precision of the spherical bodies 5a to 5c) has been adequately increased by known art. Also, since the spherical bodies 5a to 5c are positioned by coming into contact with the inner peripheral face of the lens barrel 3, the latter (the positioning precision of the spherical bodies 5a to 5c) is determined by the precision of the inner peripheral face of the lens barrel 3. This inner periphery of the lens barrel 3 merely supports the outer periphery of the lenses 1 and 2, or serves as a contact face with the spherical bodies 5a to 5c, and therefore needs no special, complicated machining, and can be easily finished at high precision. Therefore, the spherical bodies 5a to 5c can be positioned at high precision, and the positioning precision of the opposing faces of the lenses 1 and 2 can be adequately increased.

Next, a method for manufacturing the combination lens of this embodiment will be described.

Figure 8:
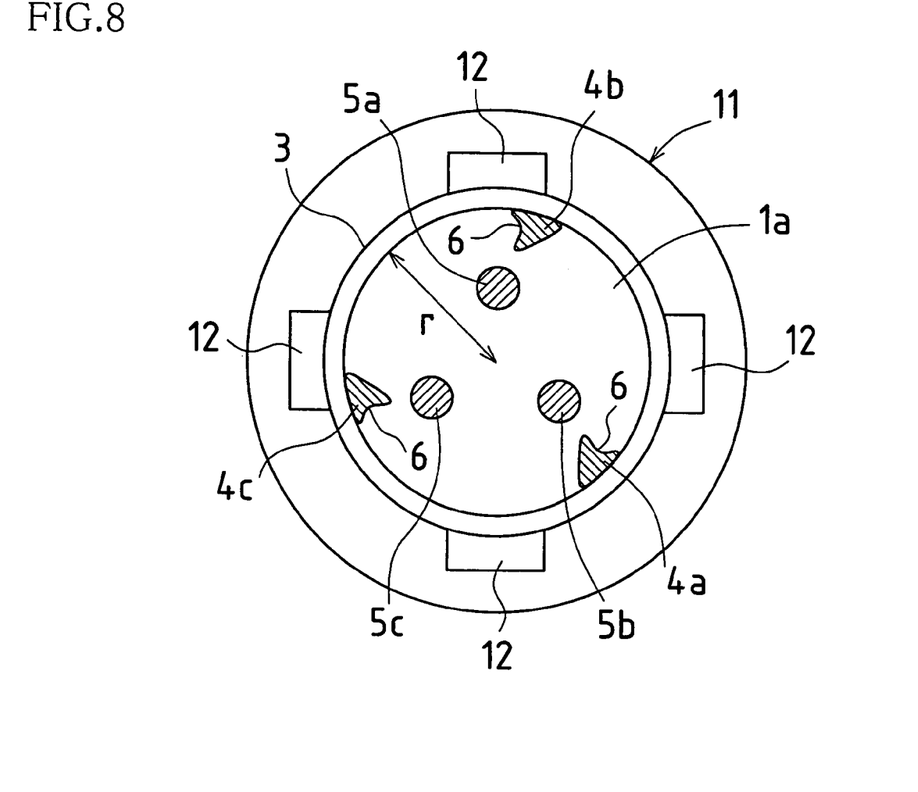
FIG. 8 is a diagram showing a step of a method for manufacturing a combination lens of the present invention.

First, as shown in FIG. 8, the lens barrel 3 is disposed at the rotational center of a rotary jig 11, and the lens barrel 3 is fixed by fixing pieces 12 of the rotary jig 11.

The lens 1 is then mounted inside the lens barrel 3 with the rotary jig 11 stopped, and a tacking agent or elastic adhesive agent is dropped on three different portions on the flat edge 1a at the outer peripheral part of the lens 1 to form the support members 4a to 4c. In this process, the tacking agent or elastic adhesive agent is applied in drops such that the support members 4a to 4c come into tight contact with the inner peripheral wall 3a of the lens barrel 3.

Figure 9:
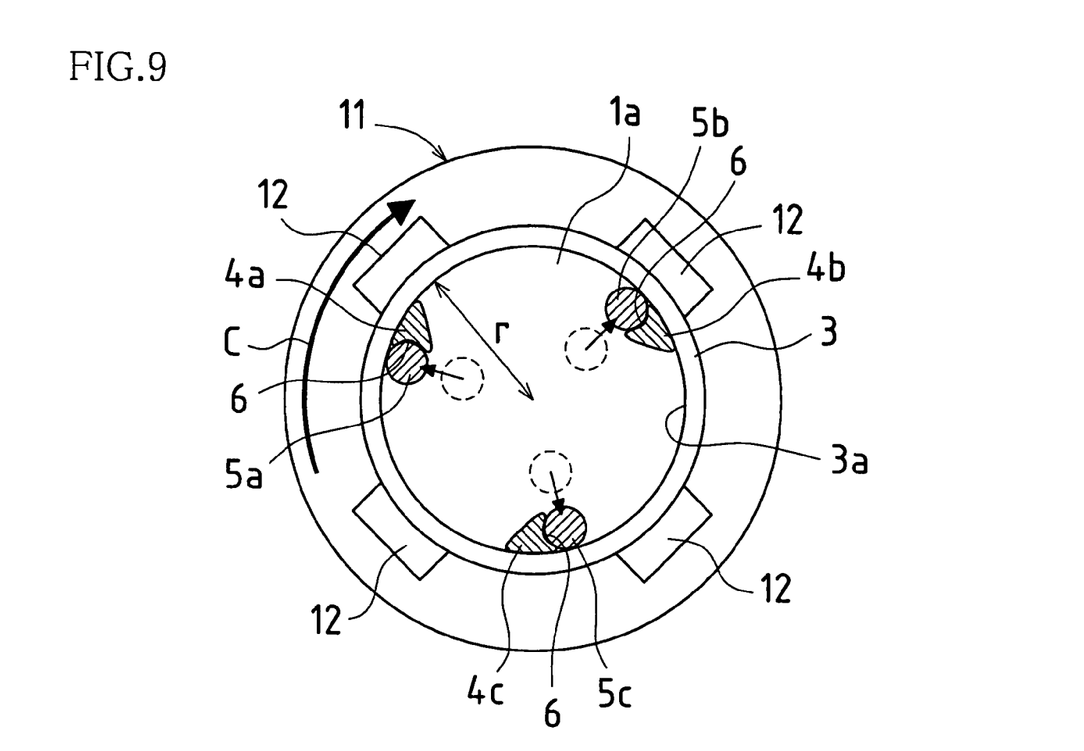
FIG. 9 is a diagram showing the next step after that in FIG. 8.

Next, the spherical bodies 5a to 5c are respectively disposed near one end of the support members 4a to 4c on the surface of the lens 1. In this state, as shown in FIG. 9, the rotary jig 11 is rotated in the direction of the arrow C, so that the lens barrel 3 and the lens 1 also rotate in the same direction. At this point, centrifugal force acts on the spherical bodies 5a to 5c on the surface of the lens 1, the spherical bodies 5a to 5c move toward the inner peripheral wall 3a of the lens barrel 3, and while the spherical bodies 5a to 5c are pressed against the inner peripheral wall 3a of the lens barrel 3, they move along the inner peripheral wall 3a toward one end of the support members 4a to 4c, respectively. As the spherical bodies 5a to 5c are respectively pressed against one end of the support members 4a to 4c, they form the recesses 6 in the support members 4a to 4c, and are fitted into these recesses 6 in the support members 4a to 4c, so that they are supported and fixed by the recesses 6 in the support members 4a to 4c.

After this, the lens 2 is mounted inside the lens barrel 3 to sandwich the spherical bodies 5a to 5c between the lenses 1 and 2 and complete a combination lens.

This manufacturing method allows the spherical bodies 5a to 5c to be easily brought into contact with the inner peripheral wall 3a of the lens barrel 3 and the recesses 6 of the support members 4a to 4c, reduces errors in the disposition of the spherical bodies 5a to 5c, and affords higher lens assembly precision.

Furthermore, the combination lens of this embodiment entails the combination of two lenses, but even when three or more lenses are combined, the opposing faces of the lenses can be positioned at higher precision by disposing three or more support members and spherical bodies between the lenses. Therefore, the present invention can be applied regardless of the number of lenses.

Also, the opposing faces of the lenses preferably have a shape that will produce a force that pushes the sandwiched spherical bodies toward the outside of the lenses. For instance, it is preferable to use a combination in which one is a convex surface and the other is a flat or convex surface, or a combination in which one is a convex surface and the other is a concave surface with a smaller curvature than the convex surface. These opposing faces may be parallel to each other, or they may have a shape that produces a force that pushes the sandwiched spherical bodies toward the inside of the lenses, as long as this force is small.

Furthermore, as the support members, those composed of a tacking agent or an adhesive agent were given as an example, but the entire support members need not be a tacking agent or an adhesive agent, and only the recesses of the support members or the area near these recesses may be made of a material that exhibits tackiness or adhesion.

The present invention can be embodied in a variety of other forms without departing from the main characteristics or essence thereof. Accordingly, the embodiments given above are in all respects nothing more than examples, and should not be interpreted to be limiting in nature. The scope of the present invention is as indicated by the Claims, and is in no way restricted to the text of this Specification. Furthermore, changes and modifications falling within an equivalent scope of the Claims are all within the scope of the present invention.

What is claimed is:

1. A combination lens in which at least two lenses are housed in a lens barrel, comprising:
    at least three spherical bodies disposed between opposing faces of the lenses; and
    support members that are disposed along an inner peripheral wall of the lens barrel at one of the opposing faces of the lenses, respectively support the spherical bodies and being composed of tack force or adhesive force,
    wherein the support members have respective recesses to support the spherical bodies, and
    wherein the spherical bodies are pressed against the inner peripheral wall of the lens barrel and the support members, and are received and supported by the recesses of the support members.

2. The combination lens according to claim 1, wherein the support members are disposed at one of the opposing faces of the lenses.

3. The combination lens according to claim 1, wherein the support members are a photosetting type of adhesive agent.

4. The combination lens according to claim 1, wherein the height of the support members in the radial direction of the lenses is greater than the radius of the spherical bodies.

5. The combination lens according to claim 1, wherein the thickness of the support members in the optical axis direction of the lenses is greater than the radius of the spherical bodies.

6. The combination lens according to claim 1, wherein the spherical bodies are made of a paramagnetic substance.

7. The combination lens according to claim 1, wherein the support members are bonded to the inner peripheral wall of the lens barrel.

8. A method of manufacturing the combination lens according to any one of claims 1 to 7, wherein
    centrifugal force is generated in the spherical bodies around the optical axis of the lens, so that the spherical bodies come into contact with the inner peripheral wall of the lens barrel and with the support members, and
    the spherical bodies are supported by the support members.

* * * * *